United States Patent
Baumann et al.

(10) Patent No.: US 6,847,750 B1
(45) Date of Patent: Jan. 25, 2005

(54) THERMO-OPTICAL WAVEGUIDE SWITCH

(75) Inventors: Ingo Baumann, Zorneding (DE);
Reinhard Marz, Munich (DE);
Hartmut Schneider, Munich (DE)

(73) Assignee: Optun (BVI) Ltd., Tortola (VG)

( * ) Notice: Subject to any disclaimer, the term of this patent is extended or adjusted under 35 U.S.C. 154(b) by 85 days.

(21) Appl. No.: 10/149,324

(22) PCT Filed: Nov. 22, 2000

(86) PCT No.: PCT/DE00/04112

§ 371 (c)(1),
(2), (4) Date: Jul. 15, 2002

(87) PCT Pub. No.: WO01/42848

PCT Pub. Date: Jun. 14, 2001

(30) Foreign Application Priority Data

Dec. 7, 1999 (DE) ............................................. 199 58 899

(51) Int. Cl.$^7$ ................................................ G02B 6/26
(52) U.S. Cl. ............................. 385/16; 14/129; 14/130; 14/132; 65/386
(58) Field of Search ................................ 385/14, 16–24, 385/49, 129, 130, 132, 141; 65/386, 403, 413, 421

(56) References Cited

U.S. PATENT DOCUMENTS

| 4,978,188 A | * | 12/1990 | Kawachi et al. | ............. 385/130 |
| 5,467,415 A | * | 11/1995 | Presby | .......................... 385/14 |

FOREIGN PATENT DOCUMENTS

| EP | 0255 270 A2 | 2/1988 |
| EP | 0 444 582 A2 | 9/1991 |
| EP | 0 653 665 A1 | 5/1995 |
| JP | 1-158 413 A | 6/1989 |

OTHER PUBLICATIONS

Patent Abstracts of Japan; Optical Waveguide and its Production, Jan. 19, 1996, Sumitoma Electric Ind. Ltd.

Sugita A. et al., Bridge–suspended Silica–Waveguide Thermo–Optic Phase Shifter and Its Application to Mach–Zehnder Type Optical Switch, Transactions of the Institute of Electronics, Information and Communication Engineers of Japan, Jp., Institute of Electronics and Communic. Engineers of Japan, Tokyo, vol. E73, No. 1, 1990, p. 105–108, XP000103975.

(List continued on next page.)

*Primary Examiner*—Phan T. H. Palmer
(74) *Attorney, Agent, or Firm*—Eitan, Pearl, Latzer & Cohen Zedek, LLP

(57) ABSTRACT

The invention relates to a thermo-optical waveguide switch which is located on a substrate. Said switch comprises a glass layer, through which a waveguide extends. A hollow chamber which lies beneath the waveguide thermally decouples the latter from the substrate. At least two supports are located in the hollow chamber to provide mechanical stability. One production method for obtaining a thermo-optical waveguide switch consists of creating a glass layer with an arrangement of perforations on a substrate. At least one hollow chamber containing at least two supports is formed by isotropically underetching the glass layer. The hollow chamber is subsequently sealed and a waveguide is formed above said hollow chamber. Another production method first creates a waveguide in a glass layer which is formed on a substrate. The glass layer in the vicinity of the waveguide is then removed using a mask and the waveguide is at least partially underetched by an isotropic etching process, thus forming a hollow chamber containing at least two supports below the waveguide.

12 Claims, 4 Drawing Sheets

OTHER PUBLICATIONS

Schneider, W.H., Realization of SIO2–B2O3–TIO2 Waveguides and Reflectors on Si Substrates in : Optical Waveguide Materials, edited by M.M. Broer et al., 1992, vol. 244, p. 337–342.

Kawachi M., Silica waveguides on silicon and their application to integrated–optic components, Optical and Quantum Electronics, vol. 22, 1990, p. 3910416, XP 000567665.

Masayuki Okuno et al., Silica–based Thermo–Optic Switches, NTT Review, vol. 7, No. 5, Sep. 1996, p. 57–63.

Tamir Th. (Ed.) Guided–Wave Optoelectronics, Springer–Verlag, 1988, p. 174–184.

* cited by examiner

PRIOR ART

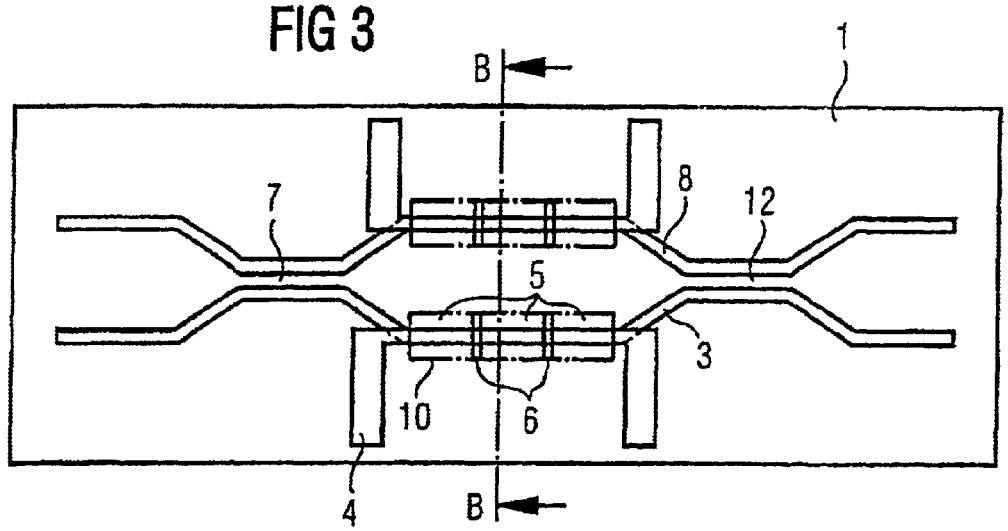
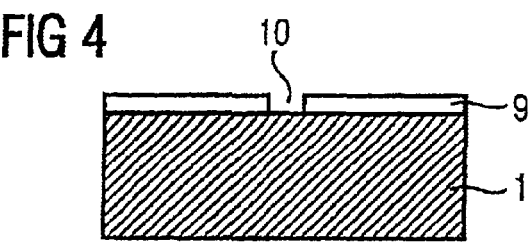
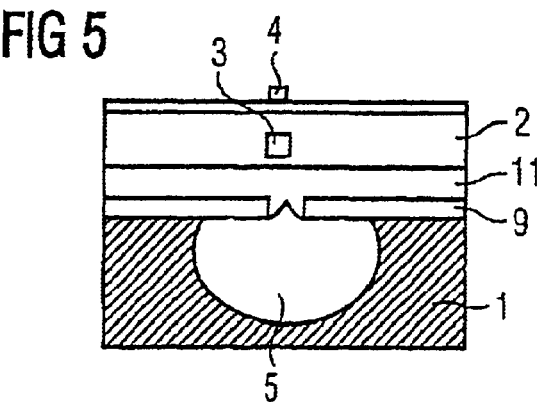

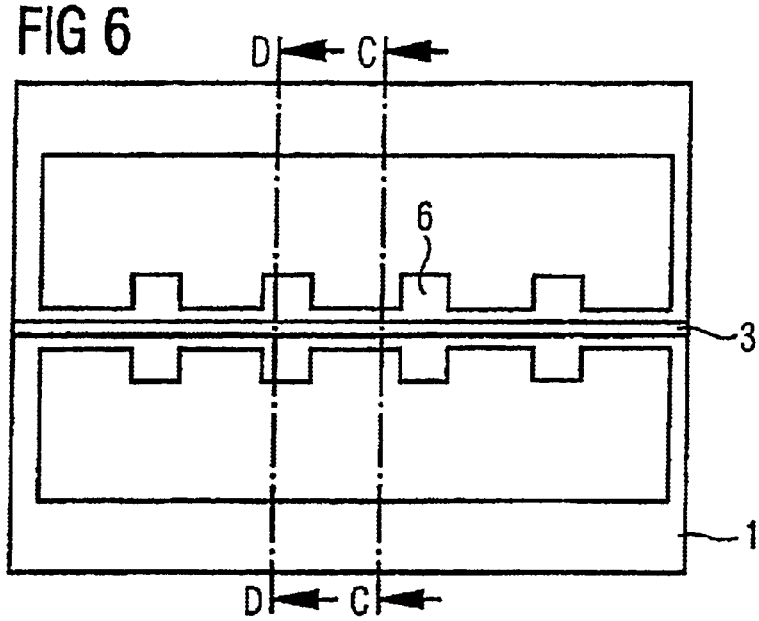
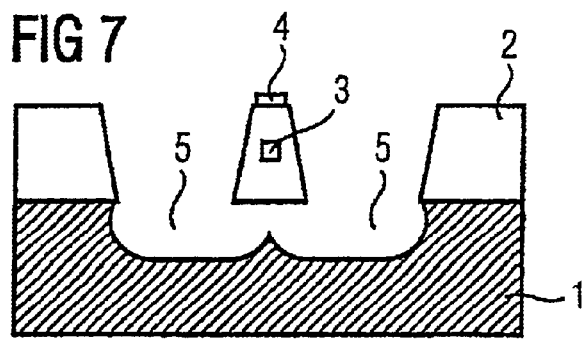
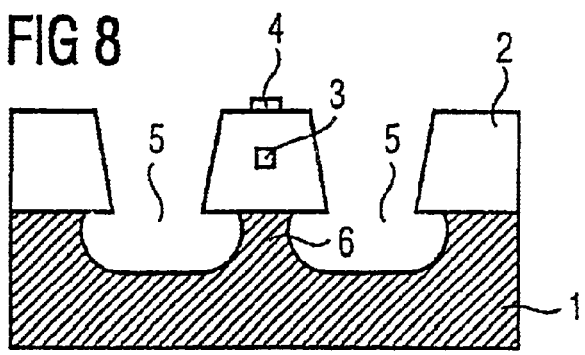

THERMO-OPTICAL WAVEGUIDE SWITCH

The present invention relates to a thermo-optical waveguide switch which is formed on a substrate. The waveguide switch furthermore comprises a glass layer arranged on the substrate, a waveguide arranged in the glass layer, a heating strip arranged above the waveguide on the glass layer, and a cavity arranged below the waveguide.

Waveguide components serve for transmitting, modifying, regulating and controlling optical signals. Such elements are used in optical networks for the distribution or changeover of light signals between different light-guiding fiber paths. In a manner similar to that in the case of the light-guiding fiber for optical transmission on long paths, glasses based on silicon dioxide which are modified for example by admixtures of germanium oxide, phosphorus oxide or boron oxide are used in the case of planar-optical waveguide components. In this case, the planar-optical waveguide components are fabricated on a silicon substrate. This fabrication method is described for example in M. Kawachi, "Silica waveguide on silicon and their application to integrated-optic components", Optical and Quantum Electronics 22 (1990), pp. 391–416 and H. W. Schneider, "Realisation of $SiO_2$—$B_2O_3$—$TiO_2$ Waveguides and Reflectors on Si Substrats", in "Optical Waveguide Materials", edited by M. M. Broer, R. T. Kersten, G. H. Sigel and H. Kawazoe, Materials Research Society Symposium Proceedings, vol. 244, 1992, pp. 337–342.

It has proved to be advantageous, for the purpose of electromagnetic field matching, to dimension the planar waveguide as similarly as possible to the light-guiding fiber in width, height and refractive index, in order that the coupling losses between light-guiding fiber and planar-optical waveguide are kept as small as possible.

In light-guiding fiber networks, it is necessary not only for light signals to be mixed or separated purely passively but also for said light signals to be changed over actively. The dielectric glass waveguides are initially not switchable owing to their small electro-optical coefficient. Actively controllable planar-optical waveguide components are attained, however, if the dependence of the refractive index on the temperature or on the pressure is utilized. A typical actively controllable optical component is the tunable Mach-Zehnder interferometer which is described in Theodor Tamir (ED.) "Guided-Wave Optoelectronics", Springer-Verlag, Berlin, 1988, pp. 174–184. In this case, the input signal is split via a beam splitter (directional coupler or else Y hybrid) between the two arms of the interferometer and subsequently recombined. Depending on the phase angle $\Delta\Phi=\beta\cdot\Delta L$ of the two light signals in the two arms of the interferometer, in the combiner constructive interference arises for $\Delta\Phi=m\cdot 2\pi$ and destructive interference arises for $\Delta\Phi=m\cdot 2\pi+\pi$ ($m\epsilon Z$). For constructive interference, the light signal passes to the output of the Mach-Zehnder interferometer and the output is active, and the output is inactive in the case of destructive interference.

The phase change $\Delta\Phi$ required for the optical waveguide switch for switching purposes can be effected by a state change of the planar-optical waveguide, e.g. through a temperature change. The temperature change is accompanied both by a length change $\Delta L$ and by a change in the propagation constant $\Delta\beta$, which both contribute to the change in the phase angle: $\Delta\Phi=\beta\cdot\Delta L+L\cdot\Delta\beta$ or $\Delta\Phi=\beta(dL/dT)\cdot\Delta T+L(d\beta/dT)\cdot\Delta T$.

The thermal length change is produced in accordance with the linear expansion coefficient $\alpha$ according to $\alpha=1/L\cdot dL/dT$, the change in the propagation constant on account of the thermo-optical effect $dn/dT=2/2\pi\cdot d\beta/dT$. In acousto-optical components, the phase angle is achieved by a pressure change $\Delta P$.

In planar-optical waveguide components, the glass waveguide is usually situated in a silicon dioxide layer formed on a silicon substrate. In this case, there is an outstanding mechanical contact between the silicon dioxide layer and the silicon substrate, since the silicon dioxide layer is deposited or melted-on at relatively high temperatures. As a result, the waveguide structures acquire not only high optical transparency but also the required mechanical stability. However, the fixed mechanical coupling of the glass structure to the substrate has the effect that thermal implementing of the waveguide, which is intended to bring about a phase change $\Delta\Phi$ in order that the Mach-Zehnder interferometer can be switched, is attenuated to a very great extent. This is due to the high thermal conductivity of the silicon substrate which dissipates the supplied heat very rapidly, something which leads to high heating powers and adversely affects the heating balance. In practice, particularly in the case of complex circuits, this leads to undesirable problems such as e.g. local overheating and necessitates additional cooling devices.

Therefore, Masayuki Okuno, Nori Takato, Tsutomu Kitoh, Akio Sugita, "Silica-Based Thermo-optic Switches", NTT Review, vol. 7, no. 5, 1995, pp. 57–63, have already proposed unsupported $SiO_2$ structures which are decoupled from the substrate and have been realized by underetching. These structures require smaller heating powers for the phase tuning, but are difficult to handle on account of their mechanical instability and fragility.

The object of the present invention is to specify a waveguide switch which has high mechanical stability and in which the required temperature change can be carried out with small heating powers. Furthermore, the object is to specify a corresponding fabrication method.

According to the invention, this object is achieved by means of the waveguide switch specified in claim 1. Claim 1 comprises: a waveguide switch having: a substrate; a glass layer arranged on the substrate; a waveguide arranged in the glass layer; a heating strip arranged above the waveguide on the glass layer; a cavity arranged at least partly below the waveguide, and at least two supports arranged in the cavity below the waveguide.

With regard to the method, the object set is achieved by means of the method specified in claim 3. In this case, a method is specified for fabricating a waveguide switch having the steps of: providing a substrate; covering the substrate with a glass layer; producing a hole arrangement in the glass layer, the substrate being at least partly uncovered; isotropically etching the substrate, so that at least one cavity is produced by at least partial underetching of the glass layer; covering the glass layer with a further glass layer, the cavity not being filled but rather being bridged; applying a first waveguide, so that the waveguide runs at least partly above the cavity.

As an alternative, the object set is achieved by means of the method specified in claim 5. In this case, a method is specified for fabricating a waveguide switch having the steps of: providing a substrate; forming a first glass layer on the substrate, a waveguide being formed in the glass layer; patterning the first glass layer, laterally beside the waveguide, isotropically etching the substrate, the first glass layer and thus the waveguide being partly underetched.

The present invention concerns the partial decoupling of the waveguide from the substrate. Thus, the waveguide can be influenced in its state by small thermal powers. At the same time, the required mechanical stability is preserved. To that end, hollow and solid segments are arranged alternately below the waveguide, so that the waveguide is, section by section, freely suspended and then linked to the substrate again.

In an advantageous design of the method according to the invention, the cavity is arranged not only below the first waveguide but also laterally beside the first waveguide. As a result, the first waveguide is thermally decoupled from the substrate to the greatest possible extent and it is even possible to arrange a heating strip not only above the first waveguide but also laterally beside the first waveguide. This procedure has the advantage that the waveguide can be thermally influenced intensively, from three sides.

Exemplary embodiments of the invention are illustrated and explained below with reference to the drawing.

In the figures:

FIG. 3 shows a waveguide switch according to the invention;

FIG. 4 shows a cross-section relating to the fabrication method of the waveguide switch according to the invention from FIG. 3 along the sectional line B;

FIG. 5 shows a cross-section of the waveguide switch according to the invention from FIG. 3 along the sectional line B;

FIG. 6 shows the top view of a further waveguide according to the invention;

FIG. 7 shows the waveguide according to the invention in accordance with FIG. 6 along the sectional plane C;

FIG. 8 shows the waveguide according to the invention in accordance with FIG. 6 along the sectional line D;

Figure 1:
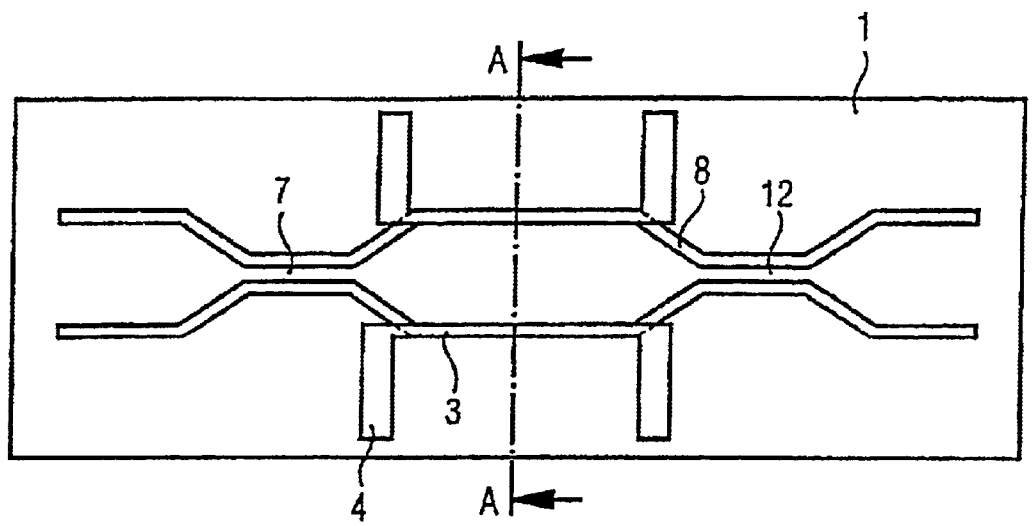
FIG. 1 shows an interferometer in accordance with the prior art.

FIG. 1 illustrates a thermo-optical waveguide switch in accordance with the prior art. The waveguide switch is formed on the substrate 1. The waveguide switch comprises a first waveguide 3 and a second waveguide 8. Furthermore, the waveguide switch comprises a first coupler 7 and a second coupler 12. The input signal is split for example via a beam splitter (directional coupler) between the two arms of the interferometer. This is done in the first coupler 7, for example. Afterward, the light signal runs along the first waveguide 3 and along the second waveguide 8. In this case, the heating strip 4 in the first waveguide 3 can bring about a phase shift $\Delta\Phi$ through a temperature change. The phase shift has the effect that constructive or destructive interference of the light signals from the first waveguide 3 and the second waveguide 8 arises in the second coupler 12.

Figure 2:
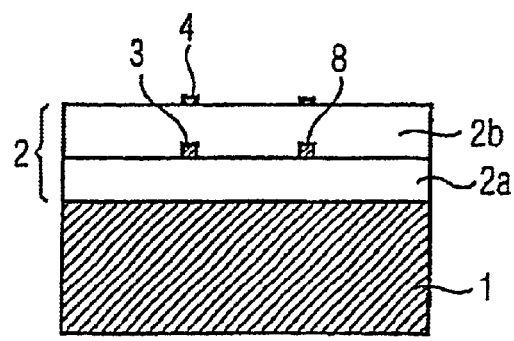
FIG. 2 shows a cross-section of the interferometer illustrated in FIG. 1, along the sectional line A.

FIG. 2 illustrates a cross-section along the sectional line A of the waveguide switch illustrated in FIG. 1. The substrate 1, which is usually formed from silicon, serves as carrier material. Situated above it is a first glass layer 2, which is usually formed from silicon dioxide. As illustrated in FIG. 2, the first glass layer 2 can be formed as a layer stack comprising a lower layer 2a and an upper layer 2b. The first glass layer 2 is preferably modified by admixture of germanium oxide, phosphorus oxide and/or boron oxide to the silicon oxide. The two glass layers 2a and 2b may differ in their configuration as far as e.g. the doping and the density are concerned. The first waveguide 3 and the second waveguide 8 run in the first glass layer 2. The heating strip 4 is arranged above the first waveguide 3.

FIG. 3 illustrates a thermo-optical waveguide switch according to the invention. The waveguide switch in FIG. 3 differs from the waveguide switch illustrated in FIG. 1 by virtue of the arrangement of a cavity 5 below the two waveguides 3 and 8. Supports 6 are arranged in the cavity 5, which supports provide for improved mechanical stability. The hole arrangement 10 thus comprises the cavity 5 in which the supports 6 are arranged.

A first variant of a fabrication method for a waveguide switch according to the invention will now be explained with reference to FIG. 4. Firstly a substrate 1 is provided. The substrate 1 is composed of silicon, for is example. A second glass layer 9 is deposited thereon, said layer being composed of silicon oxide, for example. The second glass layer 9 is typically a thermal oxide having a thickness of about 750 nm. In the region in which the waveguide is later formed, a hole arrangement 10 is produced in the second glass layer 9 by means of photolithography, the substrate 1 being at least partly uncovered. In this case, the distance between two holes of the hole arrangement 10 is expediently chosen to be significantly greater than the hole diameter of a hole. By way of example, a ratio of between 20:1 and 2:1 is chosen, ratio values around 5:1 being preferred.

With reference to FIG. 5, the substrate 1 is etched selectively with respect to the second glass layer 9 by means of an at least partly isotropic etching. If the substrate 1 is composed of silicon, then it is possible to use a plasma etching process with sulfur hexafluoride as etching gas or a wet-chemical etching process using a basic solution of potassium hydroxide. In both cases, the silicon is removed isotropically below the second glass layer 9, which acts as a silicon oxide mask layer. This produces a partly unsupported second glass layer 9 which is connected to the substrate 1 via supports 6.

For the subsequent fabrication of the waveguide, a third glass layer 11 is deposited onto the second glass layer 9. The third glass layer 11 may be formed for example with a thickness of 20 $\mu$m and is composed of silicon dioxide, for example. For the deposition, use is made for example of flame hydrolysis, which proves to be particularly suitable since, owing to the particular deposition conditions, the hollow segments are not filled but rather bridged. Flame hydrolysis involves a diffusion of relatively large particles from the flame to the plate. The deposition of the third glass layer 11 closes off the cavity 5 in the substrate 1. The first waveguide 3 is then fabricated above the cavity 5 by the methods known from the prior art. Afterward, the resistance heating element required for the state change of the waveguide is formed e.g. as heating strip 4 e.g. made of chromium or gold above the first waveguide 3.

The fabrication of a further exemplary embodiment of a waveguide switch will now be described in connection with FIG. 6. Firstly a structure is produced in accordance with FIG. 2. To that end, a substrate 1 is provided which is usually composed of silicon. Afterward, as is already known from the prior art, a first glass layer 2 is formed with a first waveguide 3 and a second waveguide 8 on the substrate 1. For the control of the waveguide switch, a heating strip 4 is arranged above the first waveguide 3. With reference to FIG. 6, the first glass layer 2 is removed on both sides of the first waveguide 3 by means of a suitable mask. In this case, the mask has locations at which little silicon dioxide of the first glass layer remains around the first waveguide 3, as is indicated on the sectional line C, and it has other positions at which more silicon dioxide of the first glass layer 2 remains around the waveguide 3, as can be seen on the sectional line D.

FIG. 7 illustrates the section along the sectional line C from FIG. 6. The substrate 1 can clearly be discerned below the first glass layer 2. The substrate 1 is then removed selectively by an isotropic etching process. This produces a freely suspended bridge in which the first waveguide 3 runs. The cavity 5 is situated below the freely suspended bridge with the first waveguide 3. The heating strip 4 is arranged above the first waveguide 3.

FIG. 8 illustrates the section along the sectional line D from FIG. 6. In this case, the first glass layer 2 is wider around the first waveguide 3, so that, during the isotropic etching of the substrate 1, the first waveguide 3 is not completely underetched, rather a support 6 remains.

Figure 9:
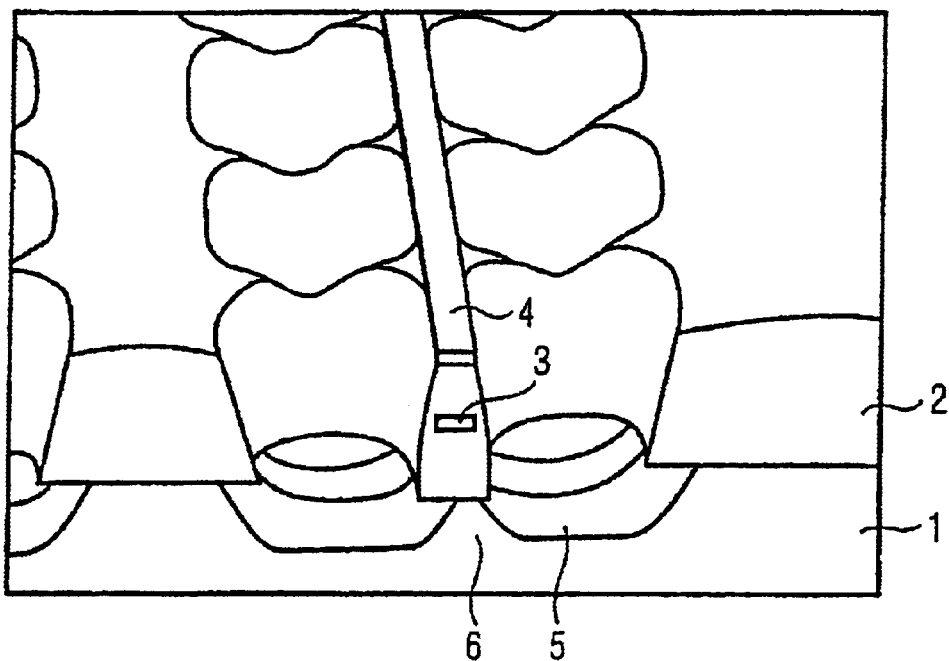
FIG. 9 shows a scanning electron microscope recording of a waveguide structure fabricated according to the invention.

FIG. 9 shows a scanning electron microscope recording of a structure already fabricated by this technique. The substrate 1 on which the first glass layer 2 is arranged can clearly be discerned. The first waveguide 3 is situated above the supports 6 arranged in the cavity 5. The heating strip 4 runs above the first waveguide 3.

Figure 10:
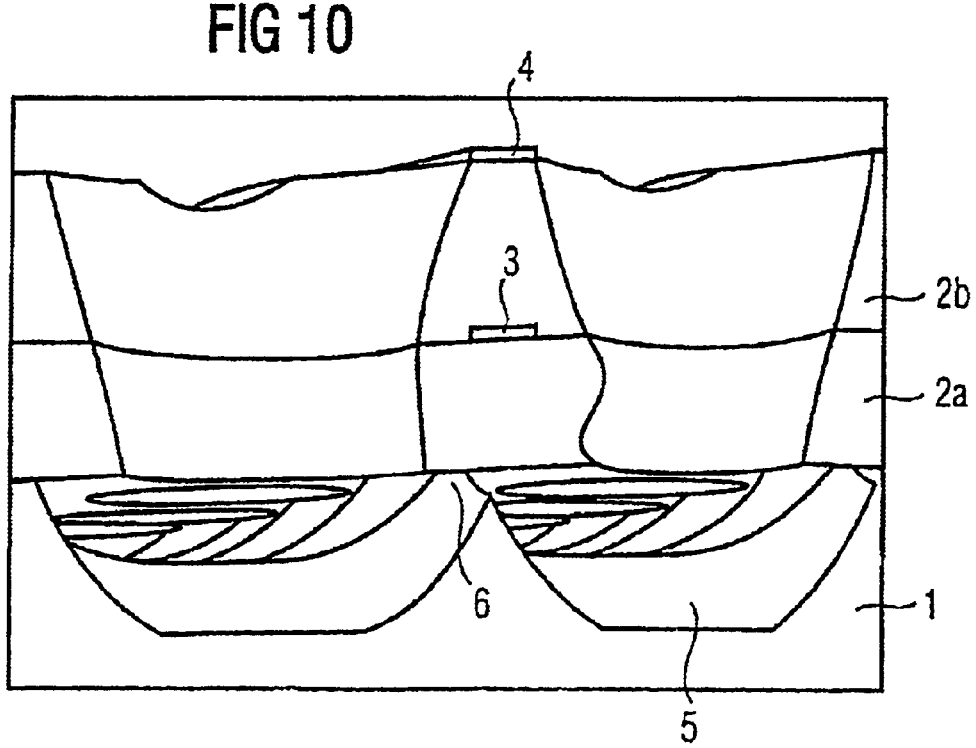
FIG. 10 shows a further scanning electron microscope recording of the waveguide structure fabricated according to the invention.

FIG. 10 illustrates a further scanning electron microscope recording which illustrates the supports 6 produced, the substrate 1, the first glass layer 2 and the first waveguide 3 from a different perspective.

What is claimed is:

1. A waveguide switch comprising:

a substrate;

a glass layer arranged on the substrate;

a waveguide arranged in the glass layer;

a heating strip arranged above the waveguide on the glass layer;

a cavity arranged at least partly below the waveguide, characterized in that at least two supports are arranged in the cavity below the waveguide.

2. The waveguide switch as claimed in claim 1, characterized in that the cavity is arranged below the waveguide and laterally beside the waveguide.

3. The waveguide of claim 1, wherein said at least two supports are substantially surrounded by said cavity.

4. A method for fabricating a waveguide switch comprising the steps of:

providing a substrate;

forming a glass layer on the substrate, a waveguide being formed in the glass layer;

patterning the glass layer, laterally beside the waveguide;

isotropically etching the substrate, the glass layer being partly underetched and at least two supports being formed in a cavity formed thereby.

5. The method as claimed in claim 4, characterized in that during the underetching of the glass layer, at least one region is formed in which the glass layer is freely suspended with the waveguide running continuously in it and at least one region is formed in which the glass layer is connected to the substrate by means of at least two supports.

6. The method of claim 4, wherein said at least two supports are substantially surrounded by said cavity.

7. A method for fabricating a waveguide switch comprising the steps of:

providing a substrate;

covering the substrate with a glass layer;

producing a hole arrangement in the glass layer, the substrate being at least partly uncovered;

isotropically etching the substrate, so that at least one cavity is produced by at least partial underetching of the glass layer, at least two supports being arranged in said cavity;

covering the glass layer with a further glass layer, the cavity not being filled but rather being bridged;

applying a waveguide, so that the waveguide runs at least partly above the cavity.

8. The method as claimed in claim 4, characterized in that a heating strip is formed above the waveguide.

9. A waveguide switch comprising:

a substrate;

a glass layer arranged on the substrate;

a waveguide arranged in the glass layer;

a heating strip arranged above the waveguide on the glass layer;

a cavity arranged at least partly below the waveguide, said cavity having at least first and second fluidly connected regions and characterized in that at least one support is arranged below the waveguide between said first and second cavity portions.

10. The waveguide according to claim 9, wherein said at least one support is surrounded by said cavity.

11. A method for fabricating a waveguide switch comprising the steps of:

providing a substrate;

covering the substrate with a glass layer;

producing a hole arrangement in the glass layer, the substrate being at least partly uncovered;

isotropically etching the substrate, so that at least one cavity having first and second fluidly connected regions is produced by at least partial underetching of the glass layer, at least one support being arranged between said first and second cavity regions;

covering the glass layer with a further glass layer, the cavity not being filled but rather being bridged;

applying a waveguide, so that the waveguide runs at least partly above the cavity.

12. The method of claim 11, wherein said at least one support is surrounded by said cavity.

* * * * *